July 20, 1954  H. CHESTER, SR  2,684,133
BRAKE SHOE AND LINING ASSEMBLY
Filed Oct. 3, 1952
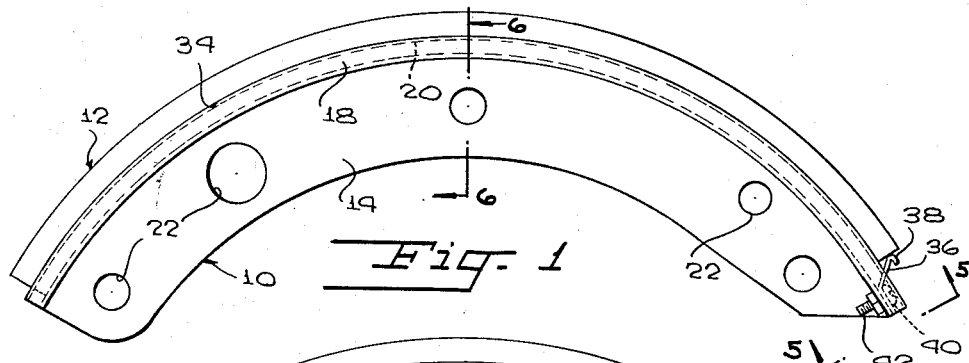
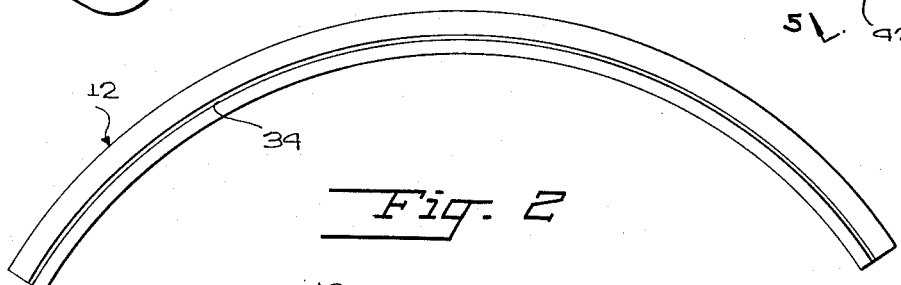
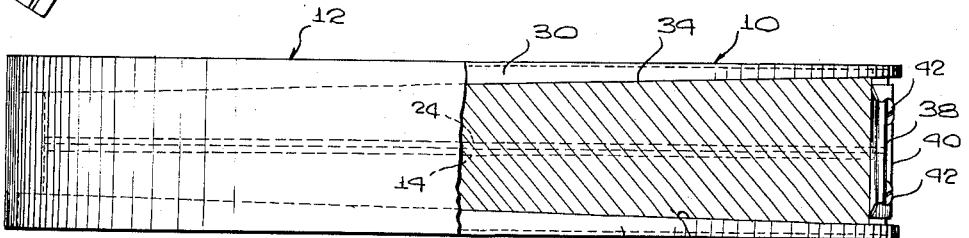
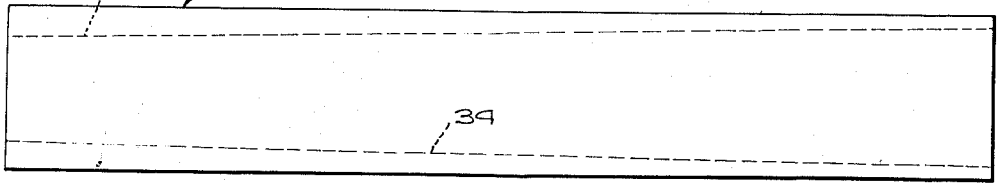
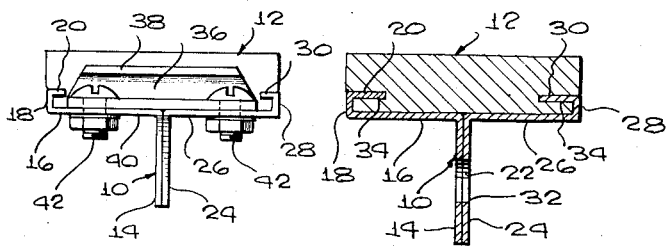
INVENTOR.
Howard Chester, Sr.
BY
McMorrow, Berman & Davidson
ATTORNEYS

UNITED STATES PATENT OFFICE 2,684,133

BRAKE SHOE AND LINING ASSEMBLY

Howard Chester, Sr., Pitman, N. J.

Application October 3, 1952, Serial No. 312,964

2 Claims. (Cl. 188—244)

This invention relates to vehicular brake construction, and more particularly, has reference to an improved brake shoe and brake lining assembly, adapted to be operatively associated with other, conventionally formed parts of a brake mounted upon a vehicle wheel.

Heretofore, a brake lining has been attached to its associated brake shoe by either of two methods of assembly, namely, a riveted connection extending between the lining and shoe, or a cemented connection whereby the lining is adhesively secured to the shoe.

It is well appreciated that the arrangement wherein the lining is cemented to its associated brake shoe has certain advantages over the riveted arrangement, since it does not result in scoring of the brake drum when the lining wears.

However, both of the conventional practices referred to above have a common deficiency, arising from the difficulty of removing the lining from the shoe when the shoe is to be relined. When a riveted connection is employed, for example, it is necessary that the rivets be punched out, and when a cemented connection is employed, it is necessary that the old lining be chiseled and/or ground off.

These are time consuming operations, as will be appreciated, and normally, keep a car out of service for an undesirably long period of time when the brakes of the vehicle are to be relined.

Additionally, the conventional methods now followed also increase, to an undesirable extent, the labor costs required when new linings are being mounted upon the shoes, since new rivets must be assembled and clinched with the lining and shoe. Alternatively, if a cemented connection is to be used, the cement must be applied to the lining and shoe, after which the assembled lining and shoe are squeezed in a press until the cement sets.

It is further a characteristic of conventional brake shoe construction that the brake shoe is generally a casting, as a result of which the formation of a brake shoe, during the initial manufacture thereof, involves a substantial number of operations such as molding, pouring, separating and cooling, snagging, etc.

The main object of the present invention is to provide a generally improved brake shoe and lining assembly which will have none of the disadvantages noted above.

Another important object is to provide a brake shoe and brake lining assembly which, so far as the manufacture of the shoe itself is concerned, will permit the shoe to be constructed in the form of complementary sections readily shaped by a suitable press from sheet metal material, and capable of being rigidly joined to provide the completed shoe, in a minimum of time.

Still another object is to provide a brake shoe and lining assembly wherein the shoe and lining are so formed as to permit the lining to be attached to or removed from its associated shoe merely by movement of the lining longitudinally of the shoe, the construction being such as to eliminate the use of rivets, or of cement.

Still another object is to provide a brake shoe and lining assembly wherein means will be incorporated, that will prevent movement of the lining relative to its associated shoe, in the assembled positions of the lining and shoe, said means being readily removable when the lining is to be replaced by a new lining.

Other objects will appear from the following description, the claims appended thereto and from the annexed drawing, in which like reference characters designate like parts throughout the several views, and wherein:

Figure 1 is a side elevational view of an assembled brake shoe and lining formed in accordance with the present invention;

Figure 2 is a side elevational view of the lining per se;

Figure 3 is a top plan of the assembled lining and shoe, partly in section;

Figure 4 is a developed view, in plan, of the brake lining per se;

Figure 5 is an end elevational view of the assembled shoe and lining, as they appear when viewed from the line 5—5 of Figure 1; and Figure 6 is an enlarged transverse sectional view through the assembled lining and shoe, taken on line 6—6 of Figure 1.

Referring to the drawing in detail, the reference numeral 10 has been applied generally to designate the improved brake shoe constituting a component part of the present invention. The reference numeral 12 has similarly been applied generally, to designate the improved brake lining adapted to be removably associated with said shoe.

Considering first the construction of the shoe 10, said shoe is formed of a pair of identical, though opposite, brake shoe sections. Each of said sections will be described in turn.

One of the brake shoe sections includes a rib member 14 extending from end to end thereof, said rib member being curved in the direction of its length, as shown in Figure 1, and being integral, along its upper longitudinal edge, with a laterally projecting web member 16. The web member 16 also extends through the full length of the brake shoe, and is curved longitudinally thereof, correspondingly to the rib member 14.

Thus, it is seen that the brake shoe section described above is, when considered from the standpoint of its cross sectional configuration, shaped right-angularly (see Figure 6).

Integrally formed upon the outer longitudinal edge of the web member 16 is a flange 18, said flange being coextensive in length with the web member and including an inner flange portion extending upwardly from the web member in a plane parallel to the plane of the rib member 14. The upper edge of the inner flange portion 18 is integral with one longitudinal edge of an outer flange portion 20.

The outer flange portion 20 has been so termed because it constitutes the outer edge portion of the flange formed upon the web member 16, and as will be noted from Figure 6, the outer flange portion is curved in the direction of its length, along a line parallel to the longitudinally curved web member 16, and spaced closely above said web member.

In the rib member 14 there is formed, at locations spaced longitudinally of the rib member, openings 22, said openings being conventionally arranged and sized to permit mounting of the brake shoe as a component part of a wheel brake assembly of an automobile or other vehicle.

The other brake shoe section, as hereinbefore noted, is formed identically but oppositely to the brake shoe section described immediately above. Accordingly, the last-named brake shoe section includes a rib member 24 integral along one longitudinal edge with a laterally projected web member 26, the web member 26 and rib member 24 being curved in the direction of their lengths. On the outer longitudinal edge of the web member 26 is provided a flange having an inner flange portion 28 extending in a plane parallel to the plane of the rib member 24, said portion 28 being integral with an inner flange 30 parallel to the web member 26.

As will be noted, the web members 16, 26 cooperate to define a web portion on the brake shoe, the rib members 14, 24 cooperating to define a mounting rib on the brake shoe. As will be noted, the brake shoe is thus given the cross sectional configuration of a T, this being the conventional cross sectional configuration of a brake shoe formed as a solid casting.

However, the brake shoe used in the invention is to be distinguished from the conventionally formed, cast shoes in that the brake shoe sections can each be pressed out of sheet metal material, by simple operations, with the rib members of said sections then being disposed in contact throughout their lengths. The contacting rib members are spot-welded at selected locations, thus to rigidly join the brake shoe sections in forming the same into the brake shoe.

When the rib members 14, 24 are fixedly connected, the openings 22 of the member 14 will register with openings 32 formed in the member 24.

Considering the construction of the brake lining, it will be understood that so far as the basic material of which said lining is formed is concerned, the lining can be manufactured from the same material as that used in making conventional linings. However, the lining utilized in the invention differs from conventional linings, in that I form longitudinal grooves 34 in the opposite longitudinal edge surfaces of the lining. The lining is shown, in this regard, in Figure 4, the lining being molded in the same manner, and from the same materials, as conventional linings, with the exception that the grooves 34 are formed therein during the molding process.

The grooves 34 are formed in the opposite longitudinal edge surfaces of the lining at locations intermediate the top and bottom faces of the lining, this construction being best shown in Figure 6. Thereafter, when the lining is to be assembled with the brake shoe, it is merely necessary that one end of the lining be inserted in one end of the brake shoe, with the lining then being shifted longitudinally of the shoe until the ends of the lining are disposed adjacent the respective ends of the shoe, in the position shown in Figure 1.

It is important to note, in this regard, that the respective grooves 34 are tapered in the direction of their lengths (see Figure 4), the flange portions 20, 30 being correspondingly tapered. The flange portions 20, 30 are oppositely tapered, as are the grooves 34, and thus said flange portions cooperate to define a wedge extending the length of the brake shoe, and following the longitudinal curvature of said shoe.

By reason of this arrangement, when the lining has been shifted longitudinally of the shoe to a position in which the lining is substantially coterminous with the shoe, the lining will be effectively wedged in place, so as to be held to the shoe securely.

It is desirable, however, that a positive means be employed for holding the assembled shoe and lining against relative longitudinal movement. To this end, I provide an abutment 36, which abutment can be formed from a small piece of sheet metal material readily pressed to a desired shape. The abutment 36 is inclined as shown in Figure 1, said abutment having an upper edge extended rearwardly to form a lip 38. The lower edge of the abutment 36 is integral with a base 40, said base being apertured and the adjacent end of the brake shoe being correspondingly apertured, for extension of fastening elements 42 through the registering apertures.

The abutment 36 extends transversely of its associated end of the brake shoe, and holds the brake lining in its wedged position, there being no possibility, due to the provision of the abutment, of the brake lining shifting to the right in Figure 3 out of said position.

It will be seen that the assembly of a lining with a brake shoe can be carried out in a minimum time, and with minimum difficulty. The lining is simply shifted longitudinally of the shoe to its proper position, after which the abutment 36 is secured in place through the medium of the fastening elements 42.

At such time as the lining is to be replaced, it is merely necessary that the fastening elements 42 be removed, thereby permitting the lining to be shifted out of engagement with the flanges of the brake shoe, for replacement of a new lining, to be used in substitution for the worn lining removed from the shoe.

The advantages inherent in a construction such as illustrated and described are believed many, and are considered to be fairly obvious. It is thought sufficient to note, in this connection, that one important advantage of the construction resides in the capability of the brake shoe for manufacture from sheet metal material, thus to reduce considerably the cost of manufacture of the shoe. Further, an important advantage resides in the fact that the lining and shoe can be readily assembled with or disassembled from one another, in a minimum time.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A brake shoe and lining assembly comprising a pair of brake shoe sections, one of said sections having a web member curved in the direction of its length and a rib member extending perpendicularly along one of the longitudinal edges of said web member and the other of said sections having a web member similarly curved in the direction of its length but with a rib member extending perpendicularly along the other of the longitudinal edges of the web member, the rib members of said sections being rigidly joined in back to back abutting relation with the web members facing away and in alignment with each other, a flange formed on the other longitudinal edge of the web member of said one shoe section and on the one longitudinal edge of the web member of said other shoe section, each flange having a portion extending transversely of its associated web member with a free edge portion extending toward and in parallel spaced relation with respect to its associated web member, said free edge portions of the flanges being tapered oppositely to define a wedge, and a brake lining substantially coextensive in length and width with and rearwardly supported upon the web members of said brake shoe sections, said lining having its opposite longitudinal edge surfaces formed with grooves extending from end to end of the lining, said grooves being oppositely tapered in the direction of their lengths to complement and receive the free edge portions of the flanges of said shoe sections.

2. A brake shoe and lining assembly comprising a pair of brake shoe sections, one of said sections having a web member curved in the direction of its length and a rib member extending perpendicularly along one of the longitudinal edges of said web member and the other of said sections having a web member similarly curved in the direction of its length but with a rib member extending perpendicularly along the other of the longitudinal edges of the web member, the rib members of said sections being rigidly joined in back to back abutting relation with the web members facing away and in alignment with each other, a flange formed on the other longitudinal edge of the web member of said one shoe section and on the one longitudinal edge of the web member of said other shoe section, each flange having a portion extending transversely of its associated web member with a free edge portion extending toward and in parallel spaced relation with respect to its associated web member, said free edge portions of the flanges being tapered oppositely to define a wedge, a brake lining substantially coextensive in length and width with and rearwardly supported upon the web members of said brake shoe sections, said lining having its opposite longitudinal edge surfaces formed with grooves extending from end to end of the lining, said grooves being oppositely tapered in the direction of their lengths to complement and receive the free edge portions of the flanges of said shoe sections, and an abutment extending transversely of the web members of said shoe sections adjacent one end thereof and bearing against the adjacent end of said lining to hold said lining in position upon said web members.

References Cited in the file of this patent

UNITED STATES PATENTS

| Number | Name | Date |
|---|---|---|
| 1,169,181 | Nichols | Jan. 25, 1916 |
| 1,246,386 | Bly | Nov. 13, 1917 |
| 1,671,759 | Bendix | May 29, 1928 |
| 1,856,812 | Jirka | May 3, 1932 |
| 1,896,013 | Reasoner | Jan. 31, 1933 |

FOREIGN PATENTS

| Number | Country | Date |
|---|---|---|
| 3,990 | Great Britain | Aug. 17, 1883 |